(12) United States Patent
Cao et al.

(10) Patent No.: US 10,710,664 B2
(45) Date of Patent: Jul. 14, 2020

(54) REVERSE TRICYCLE SUPPORT STRUCTURE

(71) Applicant: ZHEJIANG LANGXIANG INDUSTRIAL CO., LTD., Taizhou, Zhejiang (CN)

(72) Inventors: Zhipeng Cao, Zhejiang (CN); Weitao Tuo, Zhejiang (CN); Qian Wang, Zhejiang (CN)

(73) Assignee: ZHEJIANG LANGXIANG INDUSTRIAL CO., LTD., Taizhou (CN)

( * ) Notice: Subject to any disclaimer, the term of this patent is extended or adjusted under 35 U.S.C. 154(b) by 4 days.

(21) Appl. No.: 16/246,542

(22) Filed: Jan. 13, 2019

(65) Prior Publication Data

US 2019/0144064 A1     May 16, 2019

Related U.S. Application Data

(63) Continuation of application No. PCT/CN2017/099789, filed on Aug. 31, 2017.

(30) Foreign Application Priority Data

Aug. 31, 2016   (CN) ........................... 2016 1 0778317

(51) Int. Cl.
  *B62K 5/05*     (2013.01)
  *B62K 5/06*     (2006.01)
  (Continued)

(52) U.S. Cl.
  CPC ................ *B62K 5/05* (2013.01); *B62K 5/027* (2013.01); *B62K 5/06* (2013.01); *B62K 5/08* (2013.01);
  (Continued)

(58) Field of Classification Search
  CPC . B62K 5/05; B62K 5/027; B62K 5/06; B62K 5/08; B62K 11/04; B62K 25/04; B62K 25/08; B62L 1/02
  See application file for complete search history.

(56) References Cited

U.S. PATENT DOCUMENTS 8,814,186 B1    8/2014 Rinda
2007/0176384 A1    8/2007 Brudeli
(Continued)

FOREIGN PATENT DOCUMENTS

CN    202847910 U    4/2013
CN    202847937 U    4/2013
(Continued)

*Primary Examiner* — Kevin Hurley
*Assistant Examiner* — Marlon A Arce
(74) *Attorney, Agent, or Firm* — Wayne & Ken, LLC; Tony Hom

(57) ABSTRACT

Disclosed is a tricycle component, and in particular to a reverse tricycle support structure in which two steering wheels are arranged in the front and a driving wheel is arranged in the back. The reverse tricycle support structure includes a frame, a front two-wheel fixing bracket and a rear flat fork. The frame includes a frame rear section, a frame middle section and a frame front section, the frame front section is fixedly connected to the front two-wheel fixing bracket, the frame rear section is movably connected to the rear flat fork, the front two-wheel fixing bracket is fixed on two front wheels, an upper end of a rear center single shock absorption member is hingedly fixed on the frame, and a lower end of the rear center single shock absorption member is hingedly fixed on the rear flat fork.

10 Claims, 20 Drawing Sheets

(51) Int. Cl.
    *B62K 25/08*    (2006.01)
    *B62K 25/18*    (2006.01)
    *B62K 5/027*    (2013.01)
    *B62K 11/04*    (2006.01)
    *B62K 5/08*    (2006.01)
    *B62K 25/04*    (2006.01)
    *B62L 1/02*    (2006.01)

(52) U.S. Cl.
    CPC .............. *B62K 11/04* (2013.01); *B62K 25/04* (2013.01); *B62K 25/08* (2013.01); *B62K 25/18* (2013.01); *B62L 1/02* (2013.01)

(56) References Cited

U.S. PATENT DOCUMENTS

| | | | |
|---|---|---|---|
| 2017/0008591 A1* | 1/2017 | Abbott | B62K 5/10 |
| 2018/0057097 A1* | 3/2018 | Frohnmayer | B60K 1/02 |
| 2019/0047652 A1* | 2/2019 | Laberge | B62M 7/02 |
| 2019/0176921 A1* | 6/2019 | Ghezzi | B60G 11/225 |
| 2020/0001942 A1* | 1/2020 | Shibuya | B62K 11/04 |

FOREIGN PATENT DOCUMENTS

| | | |
|---|---|---|
| CN | 203186525 U | 9/2013 |
| CN | 203410576 U | 1/2014 |
| CN | 103635381 A | 3/2014 |
| CN | 104386196 A | 3/2015 |
| CN | 104477311 A | 4/2015 |
| CN | 106218782 A | 12/2016 |
| CN | 106314644 A | 1/2017 |
| CN | 206171657 U | 5/2017 |
| CN | 206187211 U | 5/2017 |
| WO | 2009059099 A2 | 5/2009 |

* cited by examiner

REVERSE TRICYCLE SUPPORT STRUCTURE

CROSS-REFERENCE TO RELATED APPLICATIONS

This application is a continuation of International Application No. PCT/CN2017/099789, filed on Aug. 31, 2017, which claims priority from Chinese Patent Application No. 201610778317.7, filed on Aug. 31, 2016, both of which are hereby incorporated by reference in their entireties.

FIELD OF THE INVENTION

The present invention relates to a tricycle component, in particular to a reverse tricycle support structure in which two steering wheels are arranged in the front and a driving wheel is arranged in the back.

BACKGROUND OF THE INVENTION

The reverse tricycle is a tricycle that has a left wheel and a right wheel in the front and a wheel in the back, where the two front wheels have a steering function and the rear wheel has a driving function. At present, the reverse tricycle support structure on the market comprises a frame, a front two-wheel fixing bracket and a rear flat fork, the frame comprises a frame rear section, a frame middle section, and a frame front section, the frame front section is fixedly connected with the front two-wheel fixing bracket, the frame rear section is connected with the rear flat fork, the front two-wheel fixing bracket is fixed on the front two wheels, an upper end of a rear center single shock absorption member is hingedly fixed on the frame, and a lower end of the rear center single shock absorption member is hingedly fixed on the rear flat fork. However, due to the difference between the frame and the front two-wheel fixing bracket, the supporting structure of the entire reverse tricycle is unreasonable, which has the defects that the front suspension structure is not distributed in a concentrated way, and the space of the front section of the reverse tricycle frame is small.

SUMMARY OF THE INVENTION

The technical problem to be solved by the technical solution of the present invention is to provide a reverse tricycle support structure, which solves the defects that the front suspension structure is not distributed in a concentrated way, and the space of the front section of the reverse tricycle frame is small.

In order to solve the above technical problem, the technical solution of the present invention is as follows:

A reverse tricycle support structure comprising a frame, a front two-wheel fixing bracket and a rear flat fork, wherein the frame comprises a frame rear section, a frame middle section and a frame front section, the frame front section is fixedly connected to the front two-wheel fixing bracket, the frame rear section is movably connected to the rear flat fork, the front two-wheel fixing bracket is fixed on two front wheels, an upper end of a rear center single shock absorption member is hingedly fixed on the frame, and a lower end of the rear center single shock absorption member is hingedly fixed on the rear flat fork, characterized in that the reverse tricycle support structure further comprises a parking lock device, the parking lock device controls left and right swing of the front two-wheel fixing bracket; the frame rear section comprises a left rear upper horizontal pipe, a left rear inclined rear standpipe, a right rear upper horizontal pipe, and a right rear inclined rear standpipe; the frame middle section comprises a left middle upper horizontal pipe, a left middle inclined rear standpipe, a left middle lower horizontal pipe, a left middle inclined front standpipe, a right middle upper horizontal pipe, a right middle inclined rear standpipe, a right middle lower horizontal pipe, and a right middle inclined front standpipe; the frame front section comprises a left front inclined standpipe, a left front horizontal pipe, a right front inclined standpipe, and a right front horizontal pipe; wherein the left rear upper horizontal pipe is smoothly connected to the left rear inclined rear standpipe, to the left middle upper horizontal pipe, to the left front inclined standpipe and to the left front horizontal pipe, a front end of the left middle lower horizontal pipe is connected with a rear end of the left middle inclined front standpipe, a rear end of the left middle lower horizontal pipe is connected with a front end of the left middle inclined rear standpipe, a front end of the left middle inclined front standpipe is connected with the left front inclined standpipe, and a rear end of the left middle inclined rear standpipe is connected with the left middle upper horizontal pipe; the right rear upper horizontal pipe is smoothly connected to the right rear inclined rear standpipe, to the right middle upper horizontal pipe, to the right front inclined standpipe and to the right front horizontal pipe, a front end of the right middle lower horizontal pipe is connected with a rear end of the right middle inclined front standpipe, a rear end of the right middle lower horizontal pipe is connected with a front end of the right middle inclined rear standpipe, a front end of the right middle inclined front standpipe is connected with the right front inclined standpipe, and a rear end of the right middle inclined rear standpipe is connected with the right middle upper horizontal pipe; a parallel bracket formed by the left rear upper horizontal pipe, the left rear inclined rear standpipe, the right rear upper horizontal pipe and the right rear inclined rear standpipe is connected with an upper connecting piece of the rear center single shock absorption member, a lower connecting piece of the rear center single shock absorption member is arranged on the rear flat fork, and the rear flat fork is movably connected between the left middle upper horizontal pipe and the right middle upper horizontal pipe; a directional riser fixing holder is fixedly connected between a parallel bracket formed by the left front horizontal pipe, the left front inclined standpipe, the right front horizontal pipe and the right front inclined standpipe, and a riser is fixedly connected to the directional riser fixing holder; the front two-wheel fixing bracket comprises a left fixing seat and a right fixing seat, the left fixing seat is fixed on a wheel hub of a left front wheel, the right fixing seat is fixed on a wheel hub of a right front wheel; the front two-wheel fixing bracket further comprises a front suspension and a support arms assembly, the front suspension comprises a cavity for centrally mounting a horizontal front shock absorption member, a front upper cavity provided at a front upper portion, a front lower cavity provided at a front lower portion, and a rear lower cavity provided at a rear lower portion; a left limit block is disposed on a left side between the front upper cavity and the front lower cavity of the front suspension, and a right limit block is disposed on aright side between the front upper cavity and the front lower cavity; the support arms assembly comprises an upper left support arm, an upper right support arm, a lower left support arm front arm, a lower right support arm front arm, a lower left support arm rear arm, and a lower right support arm rear arm, wherein an inner end of the upper left support arm and an inner end of the upper right support arm are hingedly connected and mounted within the front upper cavity via a first pin shaft; an inner end of the lower left support arm front arm and an inner end of the lower right support arm front arm are hingedly connected and mounted within the front lower cavity via a second pin shaft; an inner end of the lower left support arm rear arm and an inner end of the lower right support arm rear arm are hingedly connected and mounted within the rear lower cavity via a third pin shaft; the upper left support arm is disposed at an upper portion of the left limit block, the lower left support arm front arm is disposed at a lower portion of the left limit block, the upper right support arm is disposed at an upper portion of the right limit block, and the lower right support arm front arm is disposed at a lower portion of the right limit block; outer ends of the upper left support arm, the lower left support arm front arm, and the lower left support arm rear arm are hingedly connected to the left fixing seat; outer ends of the upper right support arm, the lower right support arm front arm, and the lower right support arm rear arm are hingedly connected to the right fixing seat; a front shock absorption member left connecting piece is disposed between the lower left support arm front arm and the lower left support arm rear arm, and a front shock absorption member right connecting piece is disposed between the lower right support arm front arm and the lower right support arm rear arm; a left side of the front shock absorption member is connected to the front shock absorption member left connecting piece, and aright side of the front shock absorption member is connected to the front shock absorption member right connecting piece.

In the reverse tricycle support structure of the technical solution sated above, since the front suspension comprises a cavity for centrally mounting a horizontal front shock absorption member, a front upper cavity provided at a front upper portion, a front lower cavity provided at a front lower portion, and a rear lower cavity provided at a rear lower portion, the horizontal front shock absorption member and the support arms assembly are arranged in the front suspension. In this way, the front suspension is compact in structure, and the space in the reverse tricycle frame front section is larger. Meanwhile, since the front suspension is arranged in the middle cavity of the front suspension, compared with a vertical front suspension solution, the position of the suspension and the gravity center of the entire vehicle are lowered. Additionally, hinged connection is used in place of universal joint connection, which lowers process requirements as well as cost.

Further, the lower left support arm front arm and the lower left support arm rear arm are integrally formed, and the lower right support arm front arm and the lower right support arm rear arm are symmetrically and integrally formed. The integral and symmetrical design reduces the investment of the mold on the one hand, and ensures support stress and fixed position of front shock absorption member.

In addition, the structures of the left and right fixing seats are further defined, where the left and right fixing seats are also integrally formed by a symmetrical design, which is defined in detail. The left fixing seat comprises a left fixing seat body, an upper left mounting platform and a lower left mounting platform, a center of the left fixing seat body extending leftward and beyond a left wheel mounting shaft for mounting a left front wheel, an upper portion of the upper left mounting platform being hingedly connected with the upper left support arm, and an upper portion of the lower left mounting platform being hingedly connected with the lower left support arm front arm and the lower left support arm rear arm; the right fixing seat comprises a right fixing seat body, an upper right mounting platform and a lower right mounting platform, a center of the right fixing seat body extending rightward and beyond a right wheel mounting shaft for mounting a right front wheel, an upper portion of the upper right mounting platform being hingedly connected with the upper right support arm, and an upper portion of the lower right mounting platform being hingedly connected with the lower right support arm front arm and the lower right support arm rear arm.

Compared with prior art, the present invention achieves the following advantages: the space in the reverse tricycle frame front section is larger. Meanwhile, since the front suspension is arranged in the middle cavity of the front suspension, compared with a vertical front suspension solution, the position of the suspension and the gravity center of the entire vehicle are lowered. Additionally, hinged connection is used in place of universal joint connection, which lowers process requirements as well as cost.

Using the reverse tricycle support structure of the present invention, in use, the upper left support arm, the upper right support arm, the lower left support arm front arm, the lower right support arm front arm, the lower left support arm rear arm, and the lower right support arm rear arm are all hingedly connected with the left fixing seat, the right fixing seat and the front suspension. The upward and downward movements of the front suspension is controlled horizontally by the front shock absorption member left connecting piece and right connecting piece arranged horizontally on the lower support arm, and the upward and downward moving positions of the upper left support arm, upper right support arm, lower left support arm front arm and lower left support arm rear arm are limited by the left limit block and the right limit block, so as to ensure stability of the fixing bracket. The method of setting the front shock absorption member horizontally can better compensate the force generated by the support arms assembly. During the use of the front shock absorption member, the position thereof changes according to the position and shape of the support arms assembly, and the vehicle is comfortable to ride.

Further, it is defined that the rear flat fork comprises a left flat fork and a right flat fork that are symmetric with each other, the left flat fork comprises a left sleeve, a left fork support arm, and a rear center single shock absorption member left mounting lug, wherein the left sleeve is fixedly connected with the left flat fork support arm, and an inner end of the left flat fork support arm is fixedly connected with the rear center single shock absorption member left mounting lug; the right flat fork comprises a right sleeve, a right fork support arm, and a rear center single shock absorption member right mounting lug, wherein the right sleeve is fixedly connected with the right flat fork support arm, and an inner end of the right flat fork support arm is fixedly connected with the rear center single shock absorption member right mounting lug; the left flat fork and the right flat fork are symmetrically arranged and fixed on the frame by a flat fork shaft, an upper end of the rear center single shock absorption member is hingedly connected with an upper end of the frame rear section, and a lower end of the rear center single shock absorption member is hingedly connected with the rear center single shock absorption member left mounting lug and the rear center single shock absorption member right mounting lug.

Using the combined rear flat fork of the above technical solution, when the tire is replaced and the motor is repaired, it is only necessary to loosen the fixing nut of the flat fork shaft (one end is locked with a nut) and the hinge shaft of the lower end of the rear center single shock absorption member so as to remove the left flat fork, thereby the tire can be replaced and the motor can be repaired without removing the rear wheel and the right flat fork. In addition, since the left flat fork and the right flat fork are of symmetrical shapes, they can be manufactured by the same pair of molds. In this way, the molds produced are also smaller than the fixed one-piece structure and are easy to manufacture, thereby reducing the cost and enhancing the interchangeability. Of course, depending on the needs of the installation, the right flat fork can also be removed separately, and the effect is the same as the structural principle.

Further, it is defined that the rear center single shock absorption member left mounting lug is disposed at a lower portion of the inner end of the left flat fork support arm, and the rear center single shock absorption member right mounting lug is disposed at a lower portion of the inner end of the right flat fork support arm.

Since the flat fork is composed of a left flat fork and a right flat fork which are symmetric with each other, the stress acting on the center of the rear wheel is large and is transmitted to the center of the flat fork shaft. That is, the joint between the left flat fork and the right flat fork experiences large stress. Therefore, the rear center single shock absorption member is more suitable for the combined flat fork. Also, arranging the mounting lugs at the lower portion of the inner end of the flat fork support arm is beneficial to reduce the stress and deformation at the joint between the left flat fork and the right flat fork. The space under the flat fork is large, which is more convenient for mounting the rear center single shock absorption member.

The front two-wheel fixing bracket comprises a support arms combination and a front suspension, the inner end of the support arm is hinged on the front suspension of the tricycle, and the outer end of the support arm is hinged on the front two-wheel fixed seat. The parking lock device comprises a swinging piece, a locking clamp and an operating handle, the swinging piece is fixedly mounted on an arm shaft of the support arm to rotate about an inner end hinge center of the support arm on which the swinging piece is to be mounted; the locking clamp comprises a locking clamp base and at least one pair of clamping friction plates, the locking clamp base is fixedly mounted on the front suspension, and the swinging piece can be clamped and released by the clamping friction plates; the operating handle comprises an operating lever and a locking member, the operating lever can operate the clamping friction plate between a state of clamping the swinging piece and a state of releasing the swinging piece, and the locking member locks the operating lever when the swinging piece is operated by the operating lever in one of the states.

The parking lock device adopting the above technical solution is specifically adapted to the reverse tricycle described in the background art. The front two-wheel fixing bracket of the reverse tricycle comprises a support arms assembly and a front suspension. The inner end of the support arm is hinged on the front suspension of the tricycle, and the outer end of the support arm is hinged on the front two-wheel fixed seat. Since the parking lock device is specially provided, the parking lock device comprises a swinging piece, a locking clamp and an operating handle, which is of a self-locking structure set on the frame or the handlebar. The self-locking technical solution can adopt the technical solutions disclosed in the patents CN104477311A, CN104386196A and CN202847937U of the Chinese publication (announcement) described in the background art. Those skilled in the art can obtain the specific structural definition by reading the above patent documents, so the structure of the self-locking operating handle is no longer limited as a necessary technical feature in the present invention.

By using the technical solution of the present invention, when the operating handle is not locked, the swinging piece is oscillated to the left and right of the reverse tricycle (that is, the inner end of the supporting arm rotates about the hinge axis), and oscillated back and forth in a gap between the clamping friction plates of the locking clamp. On the one hand, during travelling, according to different road conditions, the frictional force of the friction plate is used to relieve the left and right swing response speed of the reverse tricycle, so as to improve gradual adaptability under different road conditions. On the one hand, this will assist in defining the rotation gap of the support arm and reduce the swaying of the support arm in the front-rear direction (axial direction). When parking, the vehicle body is firstly appropriately positioned and then locked. In the locked state, the clamping friction plates of the locking clamp always clamp the swinging piece, so that the swinging piece cannot move relative to the locking clamp, and thus the inner end of the supporting arm cannot be rotated about the hinge axis. Since the locking clamp is fixed on the front suspension and the front suspension is fixed on the frame, so that when the operating handle is locked, the vehicle body does not tilt left and right, which satisfies the position adjustment requirement of the vehicle body.

Further, the specific structure of the support arm and the specific mounting position of the parking lock device part are defined. It is defined that the support arms assembly comprises an upper left support arm, an upper right support arm, a lower left support arm front arm, a lower right support arm front arm, a lower left support arm rear arm, and a lower right support arm rear arm, wherein an inner end of the upper left support arm and an inner end of the upper right support arm are hingedly connected and mounted within the front upper cavity via a first pin shaft; an inner end of the lower left support arm front arm and an inner end of the lower right support arm front arm are hingedly connected and mounted within the front lower cavity via a second pin shaft; an inner end of the lower left support arm rear arm and an inner end of the lower right support arm rear arm are hingedly connected and mounted within the rear lower cavity via a third pin shaft; the upper left support arm is disposed at an upper portion of the left limit block, the lower left support arm front arm is disposed at a lower portion of the left limit block, the upper right support arm is disposed at an upper portion of the right limit block, and the lower right support arm front arm is disposed at a lower portion of the right limit block; outer ends of the upper left support arm, the lower left support arm front arm, and the lower left support arm rear arm are hingedly connected to the left fixing seat; outer ends of the upper right support arm, the lower right support arm front arm, and the lower right support arm rear arm are hingedly connected to the right fixing seat. The swinging piece is fixedly mounted on an inner side of an arm shaft of the upper right support arm to rotate about an inner end hinge center of the upper right support arm, the locking clamp base is fixedly mounted on a mounting bracket provided on an upper portion of the front suspension, the operating lever is connected with the locking clamp by a cable or a hydraulic pipe, and the operating lever is fixed on a handlebar or the frame.

Using the technical definition that the swinging piece is fixedly mounted on an inner side of an arm shaft of the upper right support arm to rotate about an inner end hinge center of the upper right support arm, the locking clamp base is fixedly mounted on a mounting bracket provided on an upper portion of the front suspension, the operating lever is connected with the locking clamp by a cable or a hydraulic pipe, and the operating lever is fixed on a handlebar or the frame, the present invention has a compact structure and is convenient to operate. Of course, for those skilled in the art, the swinging piece can also be mounted on other supporting arms, for example, the swinging piece can be fixedly mounted on the inner side of the arm shaft of the upper left support arm and rotated about the hinge center of the inner end of the upper left arm. The mounting position of the locking clamp base on the front suspension can be also adjusted according to the position of the oscillating piece. According to the positional relationship, the locking clamp base can also be mounted on the frame. In the technical solution of the present invention, the front suspension can be part of the frame and integrated with the frame.

Further, a specific shape of the swinging piece is defined. the swinging piece comprises a fixing portion and a clamped portion, wherein the fixing portion has a shape of a linear plate that cooperates with the upper right support arm, and fixing mounting holes that cooperate with mounting posts on the upper right support arm are provided on the fixing portion; the clamped portion has a shape of a curved plate that cooperates with the clamping friction plates, a center of an arc of the curved plate is concentric with a center shaft 121 on which an inner end of the upper right support arm is hinged. The swinging piece of such a shape can ensure convenient installation in that the fixing part of the swinging piece is directly fixed to the upper right arm by a bolt or a nut, and also ensure the synchronously concentric rotation of the clamped part and the upper right support arm when the support arm swings left and right.

In the technical solution of the present invention, the front two-wheel fixing bracket is formed in the form of a hinged support arms assembly. The front two-wheel fixing bracket together with the parking lock device can ensure the flexible rotation support of the support arm during driving, and can ensure the support arm can no longer flexibly rotate during parking. Therefore, it is ensured that in the parking situation, the vehicle body will not tilt left and right, thereby satisfying position adjustment requirements of the vehicle body.

A directional riser fixing holder is added, which is fixedly connected fixedly connected between a parallel bracket formed by the left front horizontal pipe, the left front inclined standpipe, the right front horizontal pipe and the right front inclined standpipe. Such a structure is different from the structure in which the frame front section and the direction riser are integrally connected, and the position and shape of the riser fixing holder can be changed according to different design, without modifying the structure and performance of the overall frame. In this way, the directional riser is easy to adjust and replace, and is applicable to a wide variety of vehicle models. At the same time, since the frame is not connected to the riser, rotation of the directional riser has little influence on the frame. Therefore, the design of the frame can be changed according to the modeling requirements, and the space of the frame front section can be variably adjusted.

Further, it is defined that the left rear upper horizontal pipe and the right rear upper horizontal pipe are single-aimed beams. The single-armed beam means that, for a left rear upper horizontal pipe and a right rear upper horizontal pipe, there is no additional supporting force provided by any vertical support rod except for the supporting force at the rear ends of their own. The left rear upper horizontal pipe and the right rear upper horizontal pipe adopting such a structure are more advantageous for expanding the space under the lower left upper horizontal pipe and the right rear upper horizontal pipe to facilitate modeling and storage.

In addition, it is defined that the directional riser holder comprises a horizontal connecting piece and an upwardly extending fixing pipe, the horizontal connecting piece connects the left front inclined standpipe and the right front inclined standpipe, a lower end of the fixing pipe is fixedly connected with the horizontal connecting piece, and an upper end of the fixing pipe is fixedly connected with the riser. With this separate structure of the directional riser fixing holder, the position of the horizontal connecting piece and the position of the fixing pipe can be adjusted in different positions and angles on the same frame, so that it is suitable for different styles of vehicles. Even if the directional riser fixing holder needs to be replaced, it is only necessary to replace the separate directional riser fixing holder, without the need to replace the entire frame, which realizes the benefits of splitting and broaden its application scope.

DETAILED DESCRIPTION OF ILLUSTRATED EMBODIMENTS

In order to enable those skilled in the art to better understand the technical solutions of the present invention, the technical solutions of the present invention will be further described below in conjunction with the accompanying drawings and embodiments.

In the following embodiments, the front end or the front portion or the front is the forward direction of the normal running of the tricycle, that is, the end where two wheels are mounted of the present invention. The rear end or the rear portion or the rear is the direction of reversing the tricycle, that is, the end where one wheel is mounted of the present invention. The left and right are a relative relationship facing the forward direction or the front end.

Figure 1:
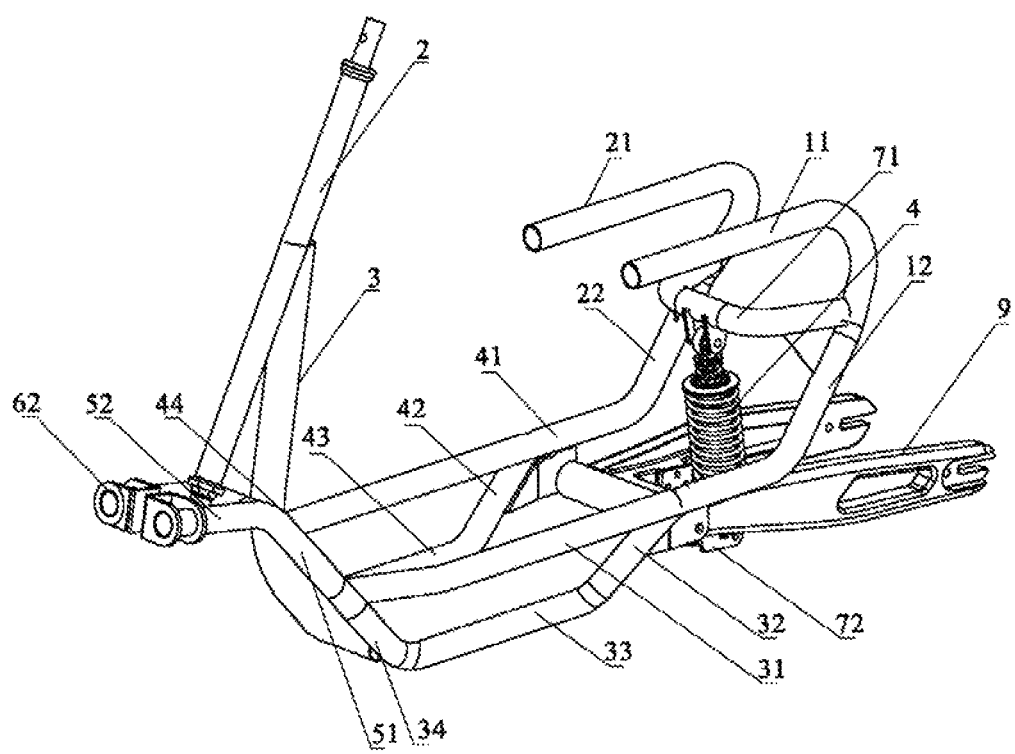
FIG. 1 is a perspective view of the frame of the reverse tricycle.
Figure 2:
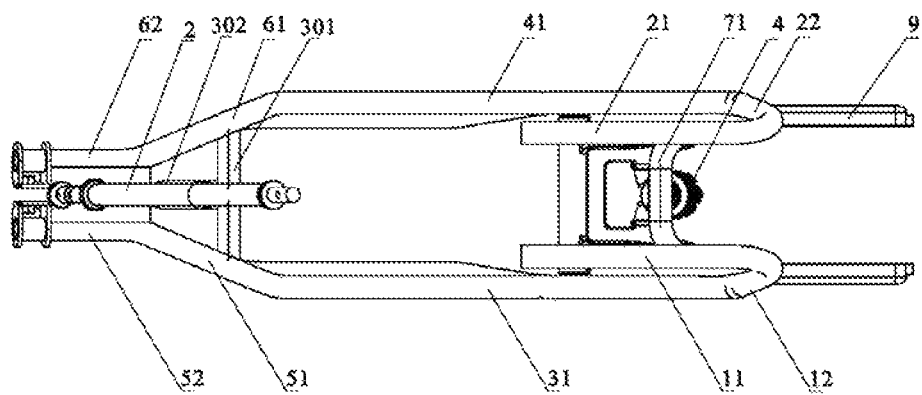
FIG. 2 is a top plan view of FIG. 1.
Figure 3:
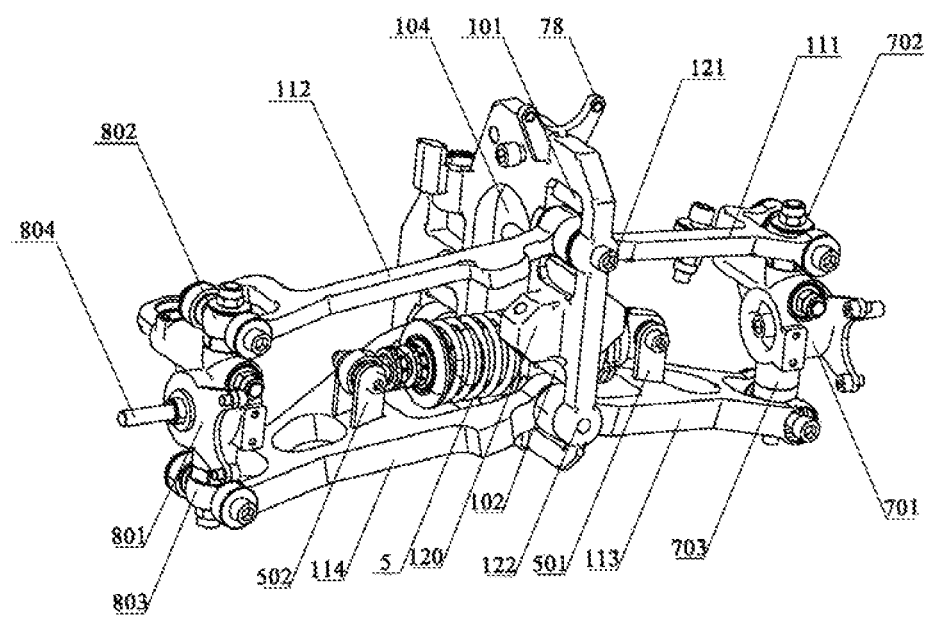
FIG. 3 is a perspective view of the front two-wheel fixing bracket of the reverse tricycle.
Figure 4:
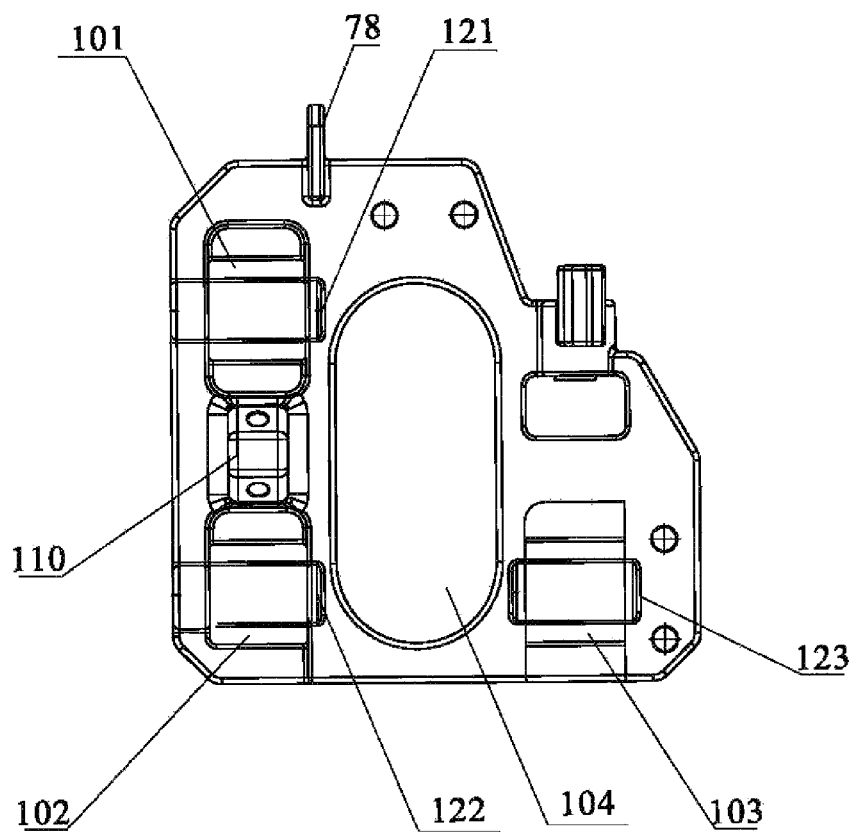
FIG. 4 is a schematic view of the front suspension of FIG. 3.
Figure 5:
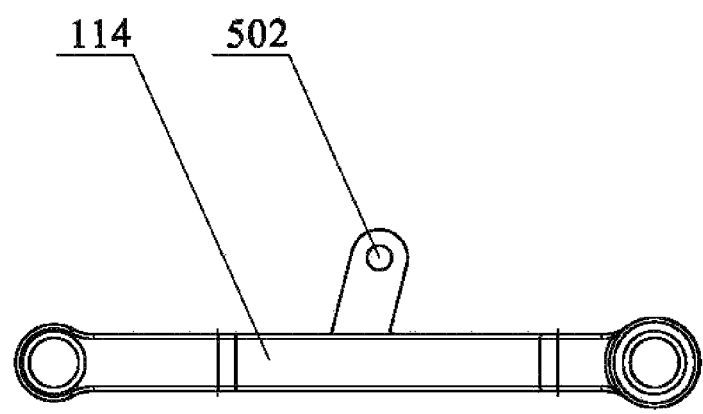
FIG. 5 is a schematic view of the lower right support arm front arm and the lower right support arm front arm assembly of FIG. 3.
Figure 6:
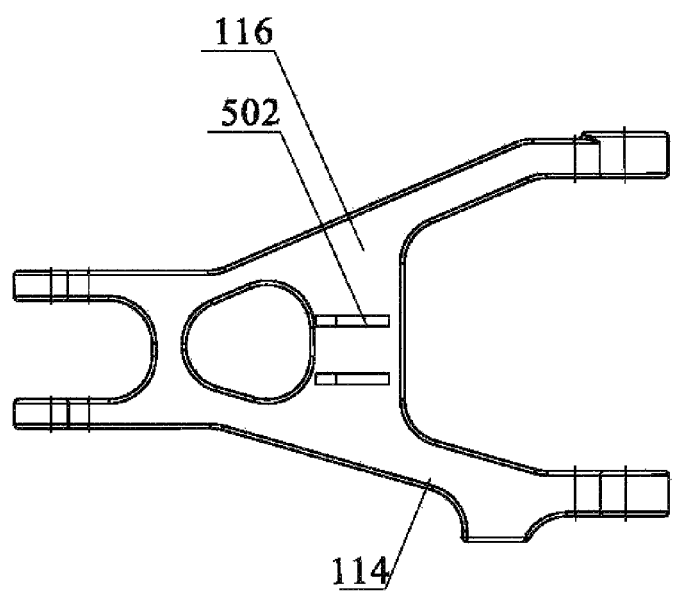
FIG. 6 is a top plan view of FIG. 5.
Figure 7:
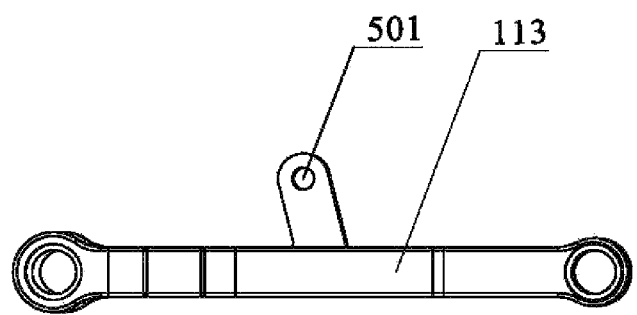
FIG. 7 is a schematic view of the lower left support arm front arm and the lower left support arm front arm assembly of FIG. 3.
Figure 8:
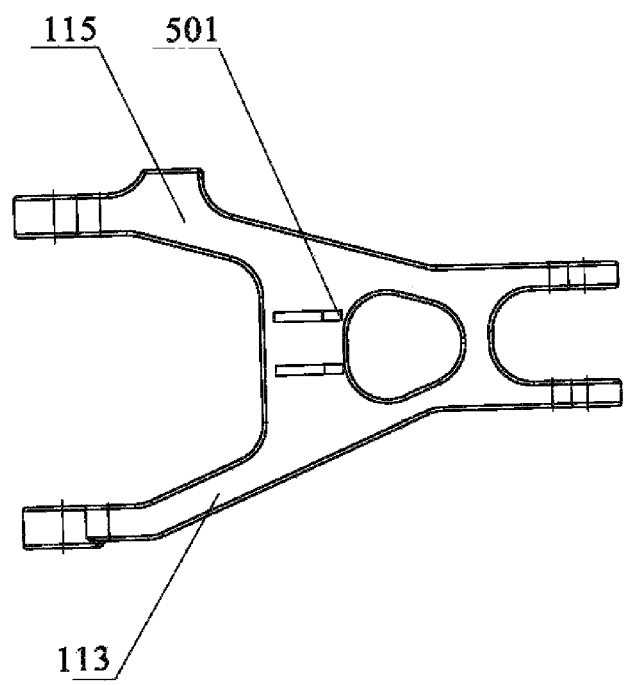
FIG. 8 is a top plan view of FIG. 7.
Figure 9:
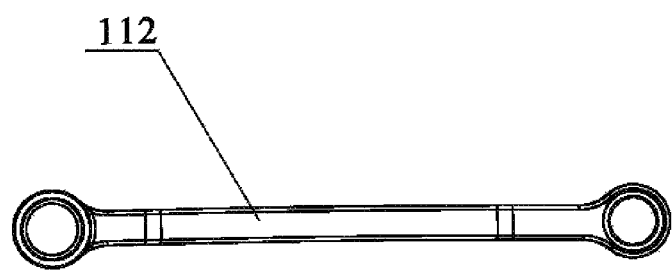
FIG. 9 is a schematic view of the upper right support arm of FIG. 3.
Figure 10:
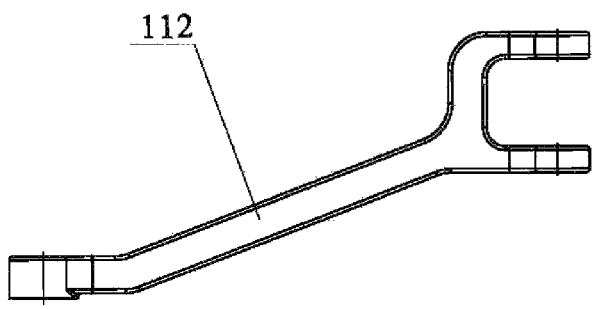
FIG. 10 is a top plan view of FIG. 9.
Figure 11:
FIG. 11 is a schematic view of the upper left support arm of FIG. 3.
Figure 12:
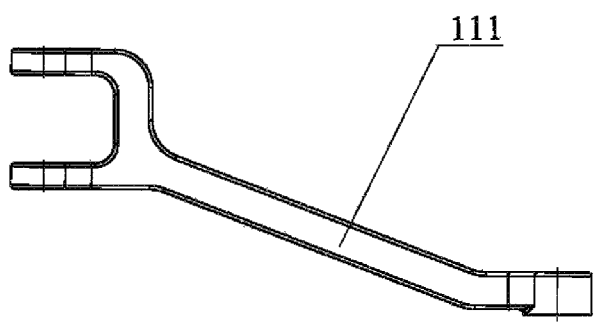
FIG. 12 is a top plan view of FIG. 11.
Figure 13:
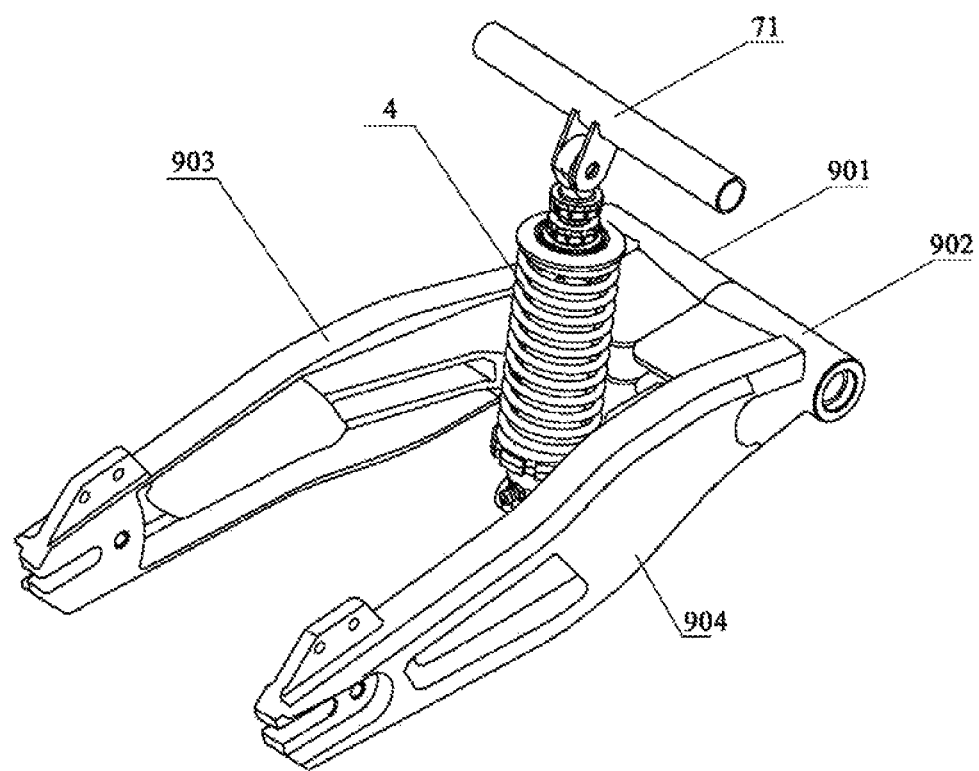
FIG. 13 is a perspective view of the rear flat fork.
Figure 14:
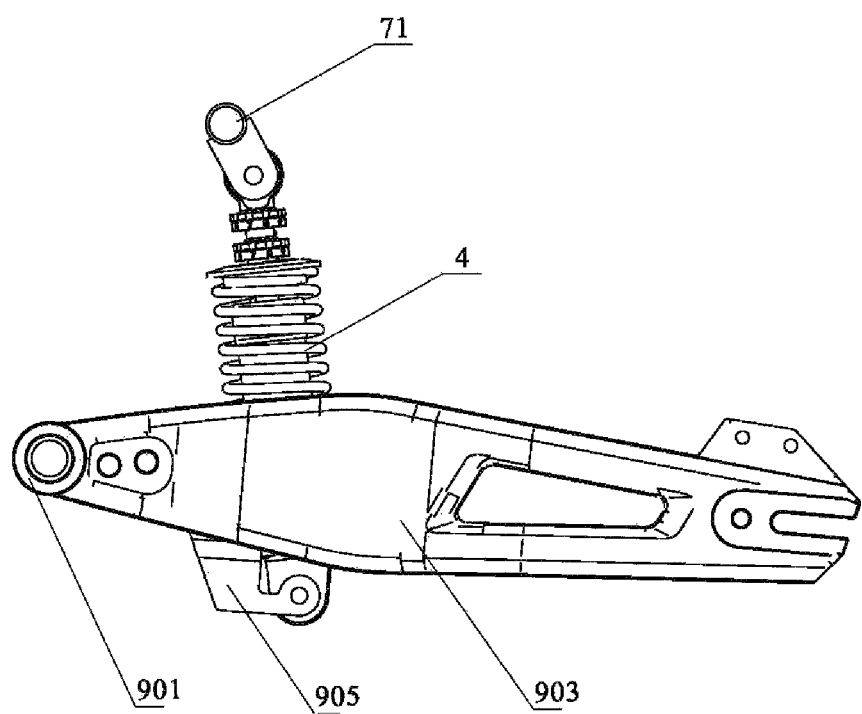
FIG. 14 is a front elevational view showing the state in which the rear flat fork is in use.
Figure 15:
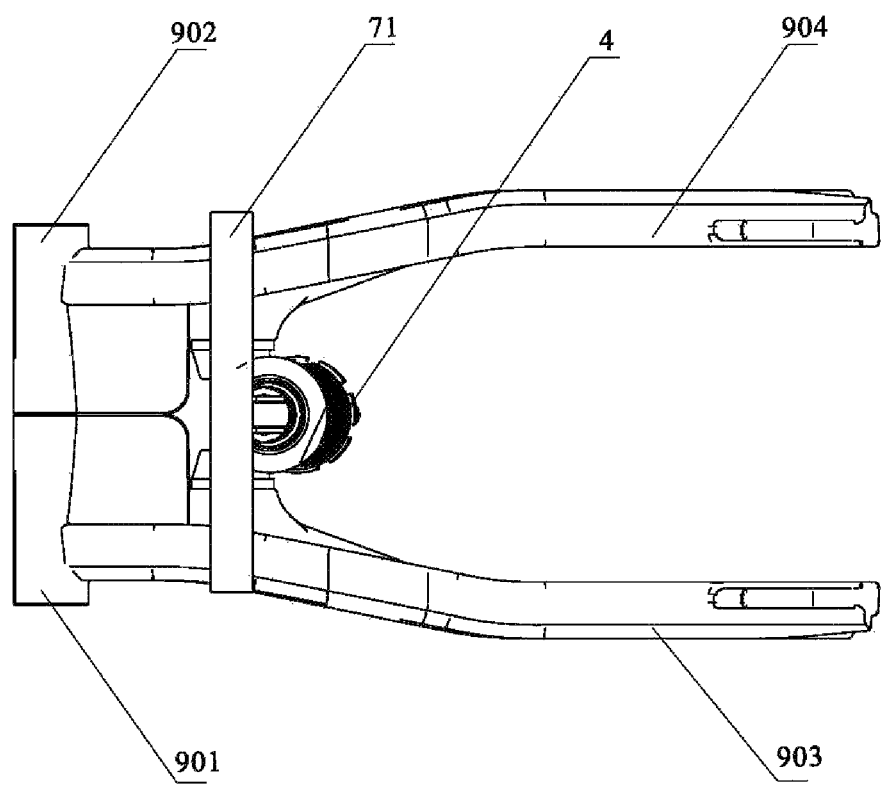
FIG. 15 is a top plan view of FIG. 14.
Figure 16:
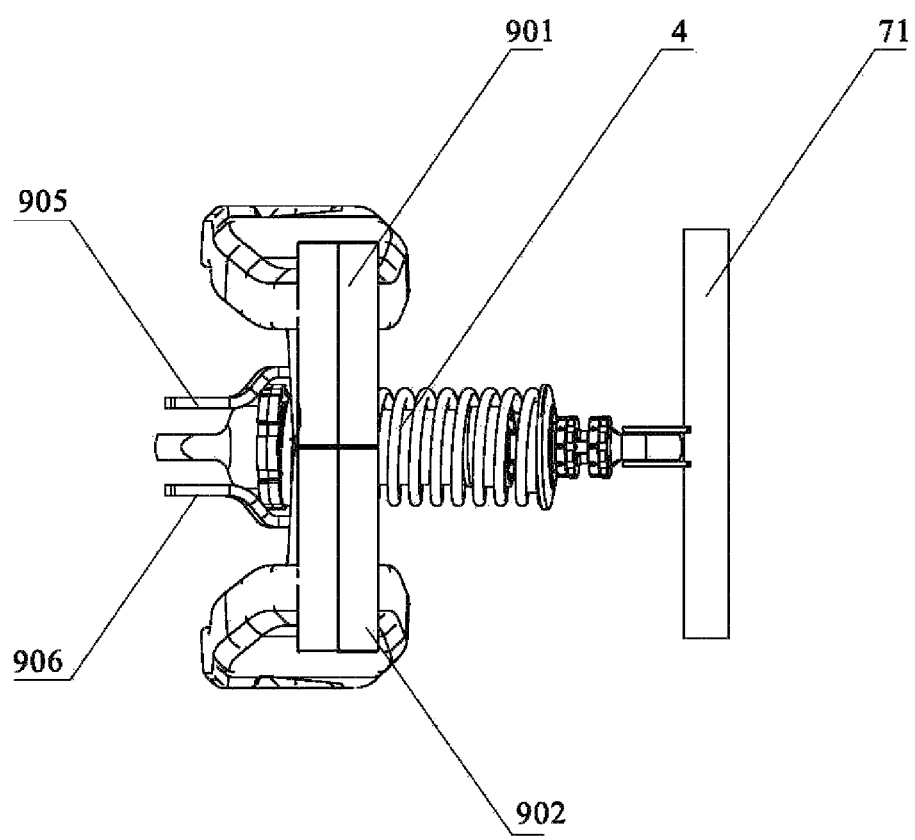
FIG. 16 is a left side view of FIG. 15.
Figure 17:
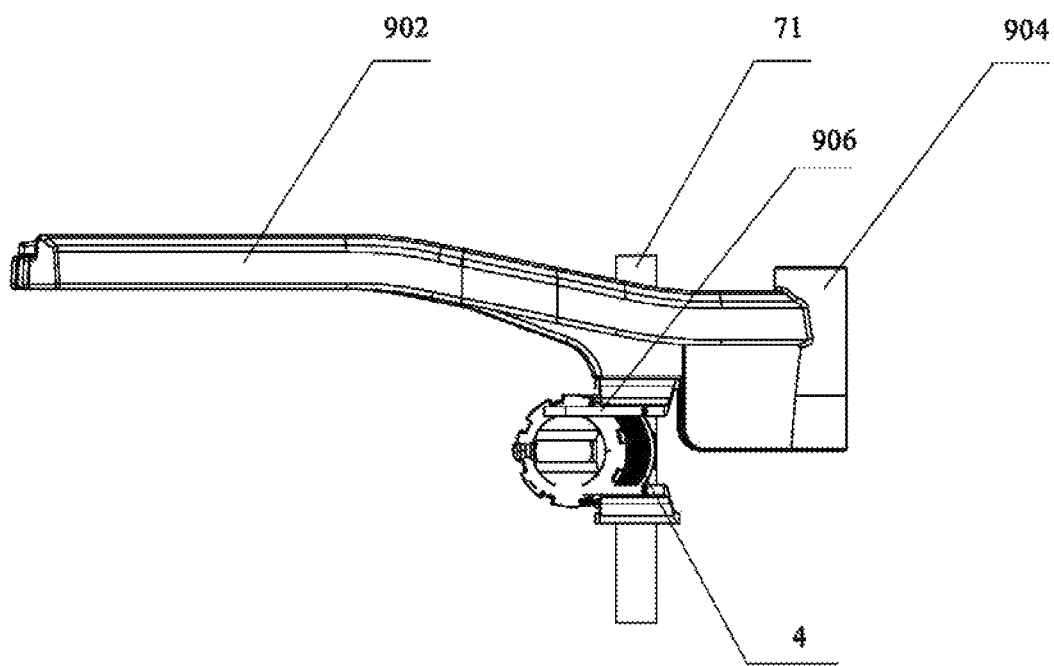
FIG. 17 is a rear elevational view of connection of the right flat fork and the rear center single shock absorbing member of FIG. 15.
Figure 18:
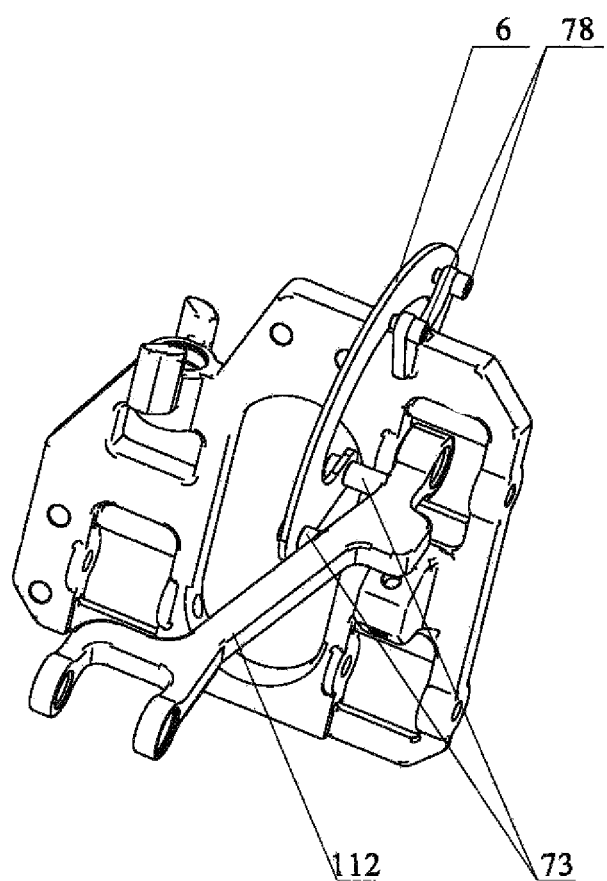
FIG. 18 is a perspective view showing the state in which the parking lock device is in use.
Figure 19:
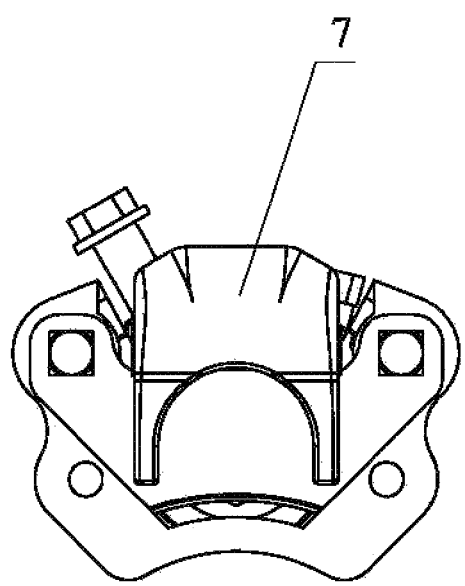
FIG. 19 is a schematic structural view of a locking clamp.
Figure 20:
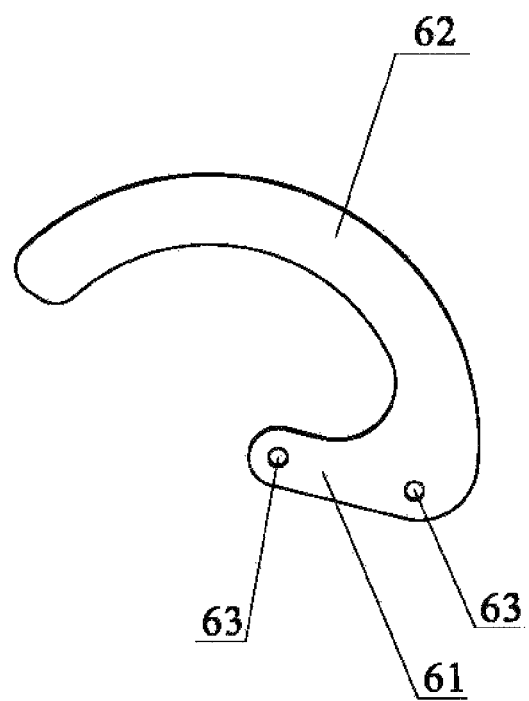
FIG. 20 is a schematic view of the structure of the swinging piece of FIG. 18.

Embodiment 1, as shown in FIG. 1 to FIG. 20,

A reverse tricycle support structure comprising a frame, a front two-wheel fixing bracket and a rear flat fork, wherein the frame comprises a frame rear section, a frame middle section and a frame front section, the frame front section is fixedly connected to the front two-wheel fixing bracket, the frame rear section is movably connected to the rear flat fork, the front two-wheel fixing bracket is fixed on two front wheels, an upper end of a rear center single shock absorption member is hingedly fixed on the frame, and a lower end of the rear center single shock absorption member is hingedly fixed on the rear flat fork, characterized in that the reverse tricycle support structure further comprises a parking lock device, the parking lock device controls left and right swing of the front two-wheel fixing bracket; the frame rear section comprises a left rear upper horizontal pipe 11, a left rear inclined rear standpipe 12, a right rear upper horizontal pipe 21, and a right rear inclined rear standpipe 22; the frame middle section comprises a left middle upper horizontal pipe 31, a left middle inclined rear standpipe 32, a left middle lower horizontal pipe 33, a left middle inclined front standpipe 34, a right middle upper horizontal pipe 41, a right middle inclined rear standpipe 42, a right middle lower horizontal pipe 43, and a right middle inclined front standpipe; the frame front section comprises a left front inclined standpipe 51, a left front horizontal pipe 52, a right front inclined standpipe 61, and a right front horizontal pipe 62.

The left rear upper horizontal pipe 11 is smoothly connected to the left rear inclined rear standpipe 12, to the left middle upper horizontal pipe 31, to the left front inclined standpipe 51 and to the left front horizontal pipe 52, a front end of the left middle lower horizontal pipe 33 is connected with a rear end of the left middle inclined front standpipe 34, a rear end of the left middle lower horizontal pipe 33 is connected with a front end of the left middle inclined rear standpipe 32, a front end of the left middle inclined front standpipe 34 is connected with the left front inclined standpipe 51, and a rear end of the left middle inclined rear standpipe 32 is connected with the left middle upper horizontal pipe 31.

According to the symmetrical design, the right rear upper horizontal pipe 21 is smoothly connected to the right rear inclined rear standpipe 22, to the right middle upper horizontal pipe 41, to the right front inclined standpipe 61 and to the right front horizontal pipe 62, a front end of the right middle lower horizontal pipe 43 is connected with a rear end of the right middle inclined front standpipe 44, a rear end of the right middle lower horizontal pipe 43 is connected with a front end of the right middle inclined rear standpipe 42, a front end of the right middle inclined front standpipe 44 is connected with the right front inclined standpipe 61, and a rear end of the right middle inclined rear standpipe 42 is connected with the right middle upper horizontal pipe 41.

A parallel bracket formed by the left rear upper horizontal pipe 11, the left rear inclined rear standpipe 12, the right rear upper horizontal pipe 21 and the right rear inclined rear standpipe 22 is connected with an upper connecting piece 71 of the rear center single shock absorption member 4, a lower connecting piece 72 of the rear center single shock absorption member 4 is arranged on the rear flat fork 9, and the rear flat fork 9 is movably connected between the left middle upper horizontal pipe 31 and the right middle upper horizontal pipe 41; a directional riser fixing holder 3 is fixedly connected between a parallel bracket formed by the left front horizontal pipe 52, the left front inclined standpipe 51, the right front horizontal pipe 62 and the right front inclined standpipe 61, and a riser 2 is fixedly connected to the directional riser fixing holder 3.

The left rear upper horizontal pipe 11 and the right rear upper horizontal pipe 21 are single-armed beams; the directional riser holder 3 comprises a horizontal connecting piece 301 and an upwardly extending fixing pipe 302, the horizontal connecting piece 301 connects the left front inclined standpipe 51 and the right front inclined standpipe 61, a lower end of the fixing pipe 302 is fixedly connected with the horizontal connecting piece 301, and an upper end of the fixing pipe 302 is fixedly connected with the riser 2.

The left rear upper horizontal pipe 11 and the right rear upper horizontal pipe 21 are provided with a seat cushion, and the rear portion of the left rear upper horizontal pipe 11 and the right rear upper horizontal pipe 21 are provided with a rear armrest. The left front horizontal pipe 52, The left front inclined standpipe 51, the left middle inclined front standpipe 34, the left middle lower horizontal pipe 33, and the left middle inclined rear standpipe 32 are a whole pipe; the left middle upper horizontal pipe 31 and the left rear inclined rear standpipe 12, and the left rear upper horizontal pipe 11 are a whole pipe; the right front horizontal pipe 62, the right front inclined standpipe 61, the right middle inclined front standpipe, the right middle lower horizontal pipe 43, and the right middle inclined rear standpipe 42 are a whole pipe; the right middle upper horizontal pipe 41, the right rear inclined rear standpipe 22, and the right rear upper horizontal pipe 21 are a whole pipe.

The front two-wheel fixing bracket comprises a left fixing seat and a right fixing seat, the left fixing seat is fixed on a wheel hub of a left front wheel, the right fixing seat is fixed on a wheel hub of a right front wheel; the front two-wheel fixing bracket further comprises a front suspension and a support arms assembly, the front suspension comprises a cavity 104 for centrally mounting a horizontal front shock absorption member 5, a front upper cavity 101 provided at a front upper portion, a front lower cavity 102 provided at a front lower portion, and a rear lower cavity 103 provided at a rear lower portion; a left limit block 110 is disposed on a left side between the front upper cavity 101 and the front lower cavity 102 of the front suspension, and a right limit block 120 is disposed on aright side between the front upper cavity 101 and the front lower cavity 102; the support arms assembly comprises an upper left support arm 111, an upper right support arm 112, a lower left support arm front arm 113, a lower right support arm front arm 114, a lower left support arm rear arm 115, and a lower right support arm rear arm 116, wherein an inner end of the upper left support arm 111 and an inner end of the upper right support arm 112 are hingedly connected and mounted within the front upper cavity 102 via a first pin shaft 121; an inner end of the lower left support arm front arm 113 and an inner end of the lower right support arm front arm 114 are hingedly connected and mounted within the front lower cavity 103 via a second pin shaft 122; an inner end of the lower left support arm rear arm 115 and an inner end of the lower right support arm rear arm 116 are hingedly connected and mounted within the rear lower cavity 103 via a third pin shaft 123; the upper left support arm 111 is disposed at an upper portion of the left limit block 110, the lower left support arm front arm 113 is disposed at a lower portion of the left limit block 110, the upper right support arm 112 is disposed at an upper portion of the right limit block 120, and the lower right support arm front arm 114 is disposed at a lower portion of the right limit block 120; outer ends of the upper left support arm 111, the lower left support arm front arm 113, and the lower left support arm rear arm 115 are hingedly connected to the left fixing seat; outer ends of the upper right support arm 112, the lower right support arm front arm 114, and the lower right support arm rear arm 116 are hingedly connected to the right fixing seat; a front shock absorption member left connecting piece 501 is disposed between the lower left support arm front arm 113 and the lower left support arm rear arm 115, and a front shock absorption member right connecting piece 502 is disposed between the lower right support arm front arm 114 and the lower right support arm rear arm 116; a left side of the front shock absorption member 5 is connected to the front shock absorption member left connecting piece 501, and aright side of the front shock absorption member 5 is connected to the front shock absorption member right connecting piece 502. The lower left support arm front arm 113 and the lower left support arm rear arm 115 are integrally formed. The left fixing seat comprises a left fixing seat body 701, an upper left mounting platform 702 and a lower left mounting platform 703, a center of the left fixing seat body 701 extending leftward and beyond a left wheel mounting shaft for mounting a left front wheel, an upper portion of the upper left mounting platform 702 being hingedly connected with the upper left support arm 111, and an upper portion of the lower left mounting platform 703 being hingedly connected with the lower left support arm front arm 113 and the lower left support arm rear arm 115; the right fixing seat comprises a right fixing seat body 801, an upper right mounting platform 802 and a lower right mounting platform 803, a center of the right fixing seat body 801 extending rightward and beyond a right wheel mounting shaft 804 for mounting a right front wheel, an upper portion of the upper right mounting platform 802 being hingedly connected with the upper right support arm 112, and an upper portion of the lower right mounting platform 803 being hingedly connected with the lower right support arm front arm 114 and the lower right support arm rear arm 116.

Using the reverse tricycle support structure of the present invention, in use, the upper left support arm 111, the upper right support arm 112, the lower left support arm front arm 113, the lower right support arm front arm 114, the lower left support arm rear arm 115, and the lower right support arm rear arm 116 are all hingedly connected with the left fixing seat, the right fixing seat and the front suspension. The upward and downward movements of the front suspension is controlled horizontally by the front shock absorption member left connecting piece 501 and right connecting piece 502 arranged horizontally on the lower support arm, and the upward and downward moving positions of the upper left support arm 111, upper right support arm 112, lower left support arm front arm 113 and lower left support arm rear arm 114 are limited by the left limit block 110 and the right limit block 114, so as to ensure stability of the fixing bracket. The method of setting the front shock absorption member horizontally can better compensate the force generated by the support arms assembly. During the use of the front shock absorption member, the position thereof changes according to the position and shape of the support arms assembly, and the vehicle is comfortable to ride.

The rear flat fork comprises a left flat fork and a right flat fork that are symmetric with each other, the left flat fork comprises a left sleeve 901, a left fork support arm 903, and a rear center single shock absorption member left mounting lug 905, where the left sleeve 901 is fixedly connected with the left flat fork support arm 903, and an inner end of the left flat fork support arm 903 is fixedly connected with the rear center single shock absorption member left mounting lug 905; the right flat fork comprises a right sleeve 902, a right fork support arm 804, and a rear center single shock absorption member right mounting lug 906, where the right sleeve 902 is fixedly connected with the right flat fork support arm 804, and an inner end of the right flat fork support arm 804 is fixedly connected with the rear center single shock absorption member right mounting lug 906; the left flat fork and the right flat fork are symmetrically arranged and fixed on the frame by a flat fork shaft 10, an upper end of the rear center single shock absorption member 4 is hingedly connected with an upper end of the frame rear section 1, and a lower end of the rear center single shock absorption member 4 is hingedly connected with the rear center single shock absorption member left mounting lug 905 and the rear center single shock absorption member right mounting lug 906. The rear center single shock absorption member left mounting lug 905 is disposed at a lower portion of the inner end of the left flat fork supporting arm 903, the rear center single shock absorption member right mounting lug 906 is disposed at a lower portion of the inner end of the right flat fork support arm 804.

The parking lock device comprises a swinging piece 6, a locking clamp 7 and an operating handle. The swinging piece 6 is fixedly mounted on an inner side of the arm shaft of the upper right support arm 112 rotate about an inner end hinge center (a center shaft 121 the inner end of the upper right support arm is hinged) of the upper right support arm, and mounting posts 73 are provided at the upper right support arm. The locking clamp comprises a locking clamp base and at least one pair of clamping friction plates (similar to the braking plates of a disc brake), the locking clamp base is fixedly mounted on a mounting bracket 71 provided on the front suspension, and the swinging piece 6 can be clamped and released by the clamping friction plates. The operating lever is connected with the locking clamp 7 by a cable or a hydraulic pipe, and the operating lever is fixed on a handlebar or the frame. The operating handle comprises an operating lever and a locking member, the operating lever can operate the clamping friction plate between a state of clamping the swinging piece and a state of releasing the swinging piece, and the locking member locks the operating lever when the swinging piece is operated by the operating lever in one of the states. The swinging piece comprises a fixing portion 61 and a clamped portion 62, where the fixing portion 61 has a shape of a linear plate that cooperates with the upper right support arm 112, and fixing mounting holes 63 that cooperate with mounting posts 73 on the upper right support arm 112 are provided on the fixing portion; the clamped portion 62 has a shape of a curved plate that cooperates with the clamping friction plates, a center of an arc of the curved plate is concentric with a center shaft 121 on which an inner end of the upper right support arm is hinged.

The aforementioned embodiment is merely a specific implementing the present invention, and is not to limit the scope of the present invention. Those skilled in the art may make modifications to specific product shapes and structures. These modifications are also regarded as equivalent technical solutions, and will not affect the technical effects and utility of the present invention.

What is claimed is:

1. A reverse tricycle support structure comprising a frame, a front two-wheel fixing bracket and a rear flat fork, wherein the frame comprises a frame rear section, a frame middle section and a frame front section, the frame front section is fixedly connected to the front two-wheel fixing bracket, the frame rear section is movably connected to the rear flat fork, the front two-wheel fixing bracket is fixed on two front wheels, an upper end of a rear center single shock absorption member is hingedly fixed on the frame, and a lower end of the rear center single shock absorption member is hingedly fixed on the rear flat fork, characterized in that the reverse tricycle support structure further comprises a parking lock device, the parking lock device controls left and right swing of the front two-wheel fixing bracket; the frame rear section comprises a left rear upper horizontal pipe, a left rear inclined rear standpipe, a right rear upper horizontal pipe, and a right rear inclined rear standpipe; the frame middle section comprises a left middle upper horizontal pipe, a left middle inclined rear standpipe, a left middle lower horizontal pipe, a left middle inclined front standpipe, a right middle upper horizontal pipe, a right middle inclined rear standpipe, a right middle lower horizontal pipe, and a right middle inclined front standpipe; the frame front section comprises a left front inclined standpipe, a left front horizontal pipe, a right front inclined standpipe, and a right front horizontal pipe; wherein the left rear upper horizontal pipe is smoothly connected to the left rear inclined rear standpipe, to the left middle upper horizontal pipe, to the left front inclined standpipe and to the left front horizontal pipe, a front end of the left middle lower horizontal pipe is connected with a rear end of the left middle inclined front standpipe, a rear end of the left middle lower horizontal pipe is connected with a front end of the left middle inclined rear standpipe, a front end of the left middle inclined front standpipe is connected with the left front inclined standpipe, and a rear end of the left middle inclined rear standpipe is connected with the left middle upper horizontal pipe;

the right rear upper horizontal pipe is smoothly connected to the right rear inclined rear standpipe, to the right middle upper horizontal pipe, to the right front inclined standpipe and to the right front horizontal pipe, a front end of the right middle lower horizontal pipe is connected with a rear end of the right middle inclined front standpipe, a rear end of the right middle lower horizontal pipe is connected with a front end of the right middle inclined rear standpipe, a front end of the right middle inclined front standpipe is connected with the right front inclined standpipe, and a rear end of the right middle inclined rear standpipe is connected with the right middle upper horizontal pipe;

a parallel bracket formed by the left rear upper horizontal pipe, the left rear inclined rear standpipe, the right rear upper horizontal pipe and the right rear inclined rear standpipe is connected with an upper connecting piece of the rear center single shock absorption member, a lower connecting piece of the rear center single shock absorption member is arranged on the rear flat fork, and the rear flat fork is movably connected between the left middle upper horizontal pipe and the right middle upper horizontal pipe; a directional riser fixing holder is fixedly connected between a parallel bracket formed by the left front horizontal pipe, the left front inclined standpipe, the right front horizontal pipe and the right front inclined standpipe, and a riser is fixedly connected to the directional riser fixing holder;

the front two-wheel fixing bracket comprises a left fixing seat and a right fixing seat, the left fixing seat is fixed on a wheel hub of a left front wheel, the right fixing seat is fixed on a wheel hub of a right front wheel; the front two-wheel fixing bracket further comprises a front suspension and a support arms assembly, the front suspension comprises a cavity for centrally mounting a horizontal front shock absorption member, a front upper cavity provided at a front upper portion, a front lower cavity provided at a front lower portion, and a rear lower cavity provided at a rear lower portion; a left limit block is disposed on a left side between the front upper cavity and the front lower cavity of the front suspension, and a right limit block is disposed on a right side between the front upper cavity and the front lower cavity; the support arms assembly comprises an upper left support arm, an upper right support arm, a lower left support arm front arm, a lower right support arm front arm, a lower left support arm rear arm, and a lower right support arm rear arm, wherein an inner end of the upper left support arm and an inner end of the upper right support arm are hingedly connected and mounted within the front upper cavity via a first pin shaft; an inner end of the lower left support arm front arm and an inner end of the lower right support arm front arm are hingedly connected and mounted within the front lower cavity via a second pin shaft; an inner end of the lower left support arm rear arm and an inner end of the lower right support arm rear arm are hingedly connected and mounted within the rear lower cavity via a third pin shaft; the upper left support arm is disposed at an upper portion of the left limit block, the lower left support arm front arm is disposed at a lower portion of the left limit block, the upper right support arm is disposed at an upper portion of the right limit block, and the lower right support arm front arm is disposed at a lower portion of the right limit block; outer ends of the upper left support arm, the lower left support arm front arm, and the lower left support arm rear arm are hingedly connected to the left fixing seat; outer ends of the upper right support arm, the lower right support arm front arm, and the lower right support arm rear arm are hingedly connected to the right fixing seat; a front shock absorption member left connecting piece is disposed between the lower left support arm front arm and the lower left support arm rear arm, and a front shock absorption member right connecting piece is disposed between the lower right support arm front arm and the lower right support arm rear arm; a left side of the front shock absorption member is connected to the front shock absorption member left connecting piece, and aright side of the front shock absorption member is connected to the front shock absorption member right connecting piece.

2. The reverse tricycle support structure according to claim 1, characterized in that the left fixing seat comprises a left fixing seat body, an upper left mounting platform and a lower left mounting platform, a center of the left fixing seat body extending leftward and beyond a left wheel mounting shaft for mounting a left front wheel, an upper portion of the upper left mounting platform being hingedly connected with the upper left support arm, and an upper portion of the lower left mounting platform being hingedly connected with the lower left support arm front arm and the lower left support arm rear arm; the right fixing seat comprises a right fixing seat body, an upper right mounting platform and a lower right mounting platform, a center of the right fixing seat body extending rightward and beyond a right wheel mounting shaft for mounting a right front wheel, an upper portion of the upper right mounting platform being hingedly connected with the upper right support arm, and an upper portion of the lower right mounting platform being hingedly connected with the lower right support arm front arm and the lower right support arm rear arm.

3. The reverse tricycle support structure according to claim 1, characterized in that the rear flat fork comprises a left flat fork and a right flat fork that are symmetric with each other, the left flat fork comprises a left sleeve, a left fork support arm, and a rear center single shock absorption member left mounting lug, wherein the left sleeve is fixedly connected with the left flat fork support arm, and an inner end of the left flat fork support arm is fixedly connected with the rear center single shock absorption member left mounting lug; the right flat fork comprises a right sleeve, a right fork support arm, and a rear center single shock absorption member right mounting lug, wherein the right sleeve is fixedly connected with the right flat fork support arm, and an inner end of the right flat fork support arm is fixedly connected with the rear center single shock absorption member right mounting lug; the left flat fork and the right flat fork are symmetrically arranged and fixed on the frame by a flat fork shaft, an upper end of the rear center single shock absorption member is hingedly connected with an upper end of the frame rear section, and a lower end of the rear center single shock absorption member is hingedly connected with the rear center single shock absorption member left mounting lug and the rear center single shock absorption member right mounting lug.

4. The reverse tricycle support structure according to claim 1, characterized in that the parking lock device comprises a swinging piece, a locking clamp and an operating handle, the swinging piece is fixedly mounted on an arm shaft of the support arm to rotate about an inner end hinge center of the support arm on which the swinging piece is to be mounted; the locking clamp comprises a locking clamp base and at least one pair of clamping friction plates, the locking clamp base is fixedly mounted on the front suspension, and the swinging piece can be clamped and released by the clamping friction plates; the operating handle comprises an operating lever and a locking member, the operating lever can operate the clamping friction plate between a state of clamping the swinging piece and a state of releasing the swinging piece, and the locking member locks the operating lever when the swinging piece is operated by the operating lever in one of the states.

5. The reverse tricycle support structure according to claim 4, characterized in that the swinging piece is fixedly mounted on an inner side of an arm shaft of the upper right support arm to rotate about an inner end hinge center of the upper right support arm, the locking clamp base is fixedly mounted on a mounting bracket provided on an upper portion of the front suspension, the operating lever is connected with the locking clamp by a cable or a hydraulic pipe, and the operating lever is fixed on a handle bar or the frame.

6. The reverse tricycle support structure according to claim 5, characterized in that the swinging piece comprises a fixing portion and a clamped portion, wherein the fixing portion has a shape of a linear plate that cooperates with the upper right support arm, and fixing mounting holes that cooperate with mounting posts on the upper right support arm are provided on the fixing portion; the clamped portion has a shape of a curved plate that cooperates with the clamping friction plates, a center of an arc of the curved plate is concentric with a center shaft on which an inner end of the upper right support arm is hinged.

7. The reverse tricycle support structure according to claim 1, characterized in that the left rear upper horizontal pipe and the right rear upper horizontal pipe are single-armed beams.

8. The reverse tricycle support structure according to claim 2, characterized in that the directional riser holder comprises a horizontal connecting piece and an upwardly extending fixing pipe, the horizontal connecting piece connects the left front inclined standpipe and the right front inclined standpipe, a lower end of the fixing pipe is fixedly connected with the horizontal connecting piece, and an upper end of the fixing pipe is fixedly connected with the riser.

9. The reverse tricycle support structure according to claim 2, characterized in that the rear flat fork comprises a left flat fork and a right flat fork that are symmetric with each other, the left flat fork comprises a left sleeve, a left fork support arm, and a rear center single shock absorption member left mounting lug, wherein the left sleeve is fixedly connected with the left flat fork support arm, and an inner end of the left flat fork support arm is fixedly connected with the rear center single shock absorption member left mounting lug; the right flat fork comprises a right sleeve, a right fork support arm, and a rear center single shock absorption member right mounting lug, wherein the right sleeve is fixedly connected with the right flat fork support arm, and an inner end of the right flat fork support arm is fixedly connected with the rear center single shock absorption member right mounting lug; the left flat fork and the right flat fork are symmetrically arranged and fixed on the frame by a flat fork shaft, an upper end of the rear center single shock absorption member is hingedly connected with an upper end of the frame rear section, and a lower end of the rear center single shock absorption member is hingedly connected with the rear center single shock absorption member left mounting lug and the rear center single shock absorption member right mounting lug.

10. The reverse tricycle support structure according to claim 2, characterized in that the parking lock device comprises a swinging piece, a locking clamp and an operating handle, the swinging piece is fixedly mounted on an arm shaft of the support arm to rotate about an inner end hinge center of the support arm on which the swinging piece is to be mounted; the locking clamp comprises a locking clamp base and at least one pair of clamping friction plates, the locking clamp base is fixedly mounted on the front suspension, and the swinging piece can be clamped and released by the clamping friction plates; the operating handle comprises an operating lever and a locking member, the operating lever can operate the clamping friction plate between a state of clamping the swinging piece and a state of releasing the swinging piece, and the locking member locks the operating lever when the swinging piece is operated by the operating lever in one of the states.

* * * * *